United States Patent
Abbondanzio et al.

(10) Patent No.: US 10,469,603 B2
(45) Date of Patent: Nov. 5, 2019

(54) USING A HISTORICAL RECORD OF ACTIONS TAKEN BY A GROUP OF USERS TO IDENTIFY RESPONSIVE ACTIONS IN A COMPUTING SYSTEM

(71) Applicant: Lenovo Enterprise Solutions (Singapore) Pte. Ltd., Singapore (SG)

(72) Inventors: Antonio Abbondanzio, Raleigh, NC (US); Matthew R. Alcorn, Durham, NC (US); Nicholas J. Balogh, Raleigh, NC (US); James G. McLean, Raleigh, NC (US); Randall W. Worzella, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 336 days.

(21) Appl. No.: 15/372,882

(22) Filed: Dec. 8, 2016

(65) Prior Publication Data
US 2018/0167261 A1    Jun. 14, 2018

(51) Int. Cl.
*H04L 12/24* (2006.01)
*H04L 29/08* (2006.01)
*H04W 4/08* (2009.01)

(52) U.S. Cl.
CPC .............. *H04L 67/22* (2013.01); *H04L 41/06* (2013.01); *H04L 41/0604* (2013.01); *H04L 41/0631* (2013.01); *H04L 41/0654* (2013.01); *H04W 4/08* (2013.01)

(58) Field of Classification Search
CPC ........... H04L 29/14; H04L 41/06–0889; H04L 69/40
See application file for complete search history.

(56) References Cited

U.S. PATENT DOCUMENTS

| | | | | |
|---|---|---|---|---|
| 5,666,481 A | * | 9/1997 | Lewis | G06F 11/2257 714/4.2 |
| 2003/0056140 A1 | * | 3/2003 | Taylor | G06F 11/0709 714/4.1 |
| 2007/0255943 A1 | * | 11/2007 | Kern | H04L 9/0894 713/155 |
| 2011/0040793 A1 | * | 2/2011 | Davidson | G06F 17/30289 707/784 |

(Continued)

OTHER PUBLICATIONS

Imran, Muhammad, et. al. "AIDR: Artificial Intelligence for Disaster Response", WWW '14 Companion, Apr. 7-11, 2014, Seoul, Korea, ACM 978-1-4503-2745-9/14/04, http://dx.doi.org/10.1145/2567948.2577034, 4 pages.

*Primary Examiner* — Brendan Y Higa
(74) *Attorney, Agent, or Firm* — Jeffrey L. Streets

(57) ABSTRACT

A method, computer program product and apparatus are provided for responding to conditions within a computing system. The method includes accessing a stored historical record of user-selected actions responsive to multiple types of conditions in a computing system, wherein each instance of a condition in the historical record is associated with a user-selected action that was taken by a user within a predetermined group of users. The method further includes identifying a current instance of a condition within the computing system, using the historical record to identify one or more actions previously used in responding to the identified current instance of a condition, and displaying the one or more identified actions on a screen of the mobile computing device.

18 Claims, 6 Drawing Sheets

(56) References Cited

U.S. PATENT DOCUMENTS

| | | | |
|---|---|---|---|
| 2013/0159428 A1* | 6/2013 | Soundararajan | G06F 9/45512 709/206 |
| 2015/0271008 A1* | 9/2015 | Jain | H04L 41/0686 714/57 |
| 2017/0126477 A1* | 5/2017 | Ponnuswamy | H04L 41/0654 |
| 2017/0289813 A1* | 10/2017 | Pashkov | H04W 12/10 |
| 2018/0152376 A1* | 5/2018 | Reumann | H04L 45/28 |

* cited by examiner

USING A HISTORICAL RECORD OF ACTIONS TAKEN BY A GROUP OF USERS TO IDENTIFY RESPONSIVE ACTIONS IN A COMPUTING SYSTEM

BACKGROUND

The present disclosure relates to methods of facilitating user management of a computing system.

Background of the Related Art

In a system management environment, such as the Lenovo XClarity administrator or the XClarity mobile application, conditions may exist that require user intervention. The complexity of computing systems may present the possibility of a wide variety of conditions occurring over time. Furthermore, each condition may require a complex action or there may be many different actions that would conceivably address the condition. However, a user with limited experience may not be aware of all possible actions and may not make the best choice of a responsive action for any given condition. The specific situation may not even allow sufficient time or opportunity for the user to discuss the condition with a more experienced user.

BRIEF SUMMARY

One embodiment provides a method that comprises accessing, by a processor, a stored historical record of user-selected actions responsive to multiple types of conditions in a computing system, wherein each instance of a condition in the historical record is associated with a user-selected action that was taken by a user within a predetermined group of users. The method further comprises identifying a current instance of a condition within the computing system; identifying, by the processor, one or more actions within the historical record that were previously used in responding to the identified current instance of a condition; and outputting the one or more identified actions for display on a display screen.

Another embodiment provides a computer program product comprising computer readable storage media that is not a transitory signal having program instructions embodied therewith, the program instructions executable by a processor to perform a method. The method comprises accessing, by a processor, a stored historical record of user-selected actions responsive to multiple types of conditions in a computing system, wherein each instance of a condition in the historical record is associated with a user-selected action that was taken by a user within a predetermined group of users. The method further comprises identifying a current instance of a condition within the computing system; identifying, by the processor, one or more actions within the historical record that were previously used in responding to the identified current instance of a condition; and outputting the one or more identified actions for display on a display screen.

Yet another embodiment provides an apparatus comprising at least one storage device for storing program instructions, and at least one processor for processing the program instructions to: access a stored historical record of user-selected actions responsive to multiple types of conditions in a computing system, wherein each instance of a condition in the historical record is associated with a user-selected action that was taken by a user within a predetermined group of users; identify a current instance of a condition within the computing system; identify one or more actions within the historical record that were previously used in responding to the identified current instance of a condition; and output the one or more identified actions for display on a display screen.

DETAILED DESCRIPTION

Figure 1:
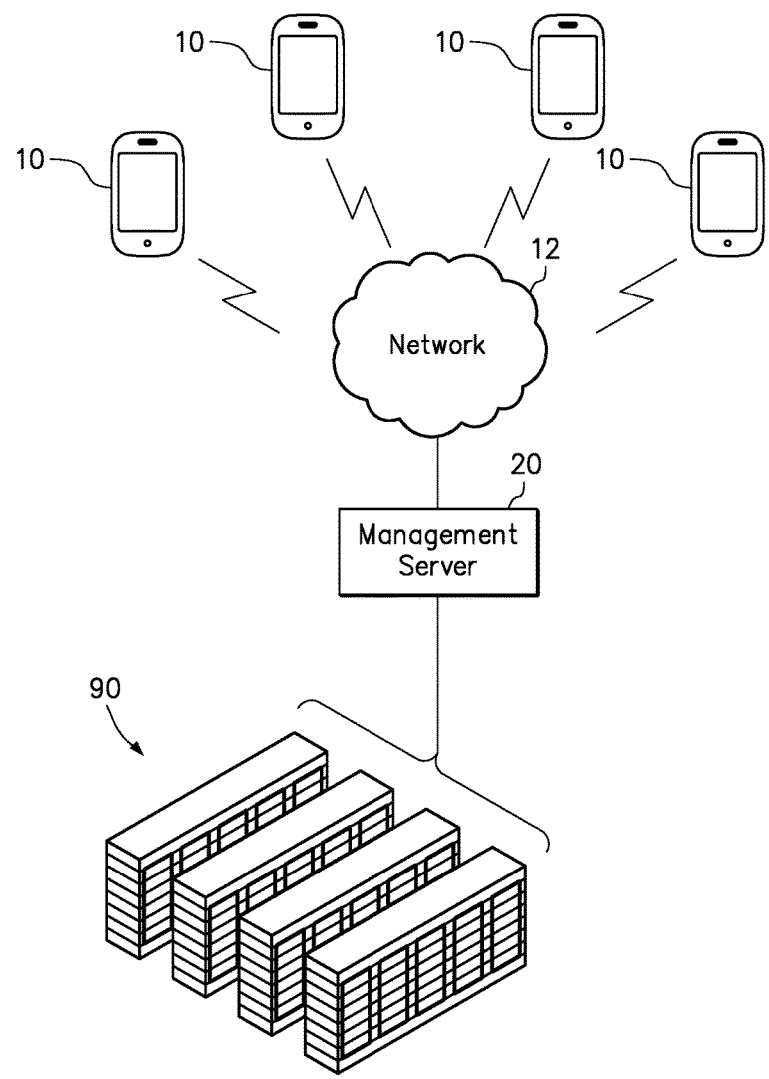
FIG. 1 is a diagram of a system including a plurality of mobile computing devices that communicate with a management server of a multi-node computing system.

One embodiment provides a method that comprises accessing, by a processor, a stored historical record of user-selected actions responsive to multiple types of conditions in a computing system, wherein each instance of a condition in the historical record is associated with a user-selected action that was taken by a user within a predetermined group of users. The method further comprises identifying a current instance of a condition within the computing system; identifying, by the processor, one or more actions within the historical record that were previously used in responding to the identified current instance of a condition; and outputting the one or more identified actions for display on a display screen.

The stored historical record is a digital record stored on a computer readable storage medium that is accessible to a processor executing program instructions. The method may include storing user-selected actions responsive to multiple types of conditions in the computing system over a period of time to form the stored historical record. The stored historical may, for example, include a separate entry for each instance that an action was selected to respond to a condition. Accordingly, each entry may identify the condition, and the action selected. Optionally, each entry may further identify the user that selected the action, whether the action was successful at addressing the condition, and other information related to the occurrence or resolution of the condition.

The computing system may, without limitation, include a blade server chassis, a computing cluster, rack-mounted computing system, or an entire computing datacenter. Furthermore, the computing system may include a wide variety of component types and models with different ages and configurations. The conditions may be directed at a single component, such as a server or network switch, or may be directed at a plurality of components, such as blade server chassis or power distribution unit for a group of servers. Examples of a condition include a loss of power, component failure, high temperature, high load, or various system errors or alerts. Furthermore, a condition may be directly identified and reported by the component experiencing the condition, may be identified by a management server that is monitoring the components, or identified by a mobile computing device that receives a notification from the component or management server. Any of the nodes or the management server may execute program instructions that cause the respective node or management server to perform one or more steps to implement various embodiments.

The mobile computing device may, without limitation, be a smartphone, notebook computer, tablet computer, or automotive computing system. The mobile computing device will have, or communicate with, a display screen for displaying information about the condition and information about actions that may be taken responsive to the condition. Furthermore, the mobile computing device will have some type of input device or interface for receiving user-input, such as selecting an action from among a plurality of displayed actions. Without limitation, the input device may be a touchscreen, a keyboard, keypad, pointing device, or a microphone and voice command module. For example, in a mobile computing device having a touchscreen, the method may display text and/or images representing a selectable action and accept touchscreen input in a region of the screen associated with the text and/or image action in order to initiate an instruction to take the action represented by the text and/or image. The mobile computing device may execute program instructions, perhaps in the form of a mobile "app", that cause the mobile computing device to perform one or more steps to implement various embodiments.

The condition within the computing system may be detected directly or indirectly by one or more component or device. For example, a component or device, such as a server that forms one of the nodes in the computing system, may detect a condition that occurs within the component or device, and report that condition to a management server. Alternatively, the management server may detect a condition within a single node, a condition for affecting multiple nodes, or a condition of the computing system as a whole. Furthermore, the mobile computing device may indirectly detect the condition via a notification received from the management server. In one embodiment, the management server detects the condition and automatically sends a notification to the mobile computing device, wherein the notification identifies the condition.

Embodiments of the method display actions that are predetermined to be responsive to the condition. Such an action may be predetermined to be responsive to a condition though a stored association of the action to the condition, wherein the stored association may be manually input during setup of a system or may be the result of a historical record gathered over time through monitoring the actions that are user-selected to respond to any given condition and correlating the actions with the conditions. Optionally, the historical record of actions may include only actions that were selected by one or more users within a predetermined group of users. For example, the predetermined group of users may include those users that are associated with a predetermined criteria selected from the group consisting of logon credentials to a designated system management device, inclusion in a predetermined list, user privileges exceeding a predetermined privilege level, and a combination thereof.

In various embodiments of the method, the mobile computing device may further display a score for each of the plurality of displayed actions, wherein the score is calculated by weighting each instance that the action has been selected for responding to the identified condition, and wherein the weighting is a user parameter associated with the user that selected the instance of the action. For example, such a score may reflect the percentage of instances that the action is selected for a given condition, where each action has been weighted according to one or more user parameter. Without limitation, the user parameter may be selected from the group consisting of an authority level, a duration that the user has had a logon to a system management device, a number of times the user has taken action responsive to the identified condition, and a combination thereof. In a further option, the method may differentiate the appearance of one or more of the displayed actions in response to the one or more actions having a score within a predetermined range of scores. Accordingly, the displayed actions may be scored and recommended based on various weighted factors and displayed in order of the magnitude of the scores.

Further embodiments of the method may include identifying a current location of the mobile computing device, wherein the displayed actions are predetermined to be allowed from the identified current location. The current location of the mobile computing device may be detected in various ways. For example, the mobile computing device may identify its own current location using signals from a global positioning system. Alternatively, a communication network may identify the current location of the mobile computing device according to the location of a wireless communication tower or access point that is currently connecting with the mobile computing device. Other systems may implement image or audio detection techniques to identify the current location of the mobile computing device. Optionally, the user could manually input a current location. It should be recognized that the current location may be a precise location (as with GPS), a general area (as with the coverage area of a wireless communication tower), or a qualitative location (as with a home, restaurant, or automobile).

Furthermore, an action may be predetermined to be allowed from a specific location through manual input during setup of the system. For example, a datacenter policy may prohibit a user from powering down a server unless the user is on site to verify that the server is not performing a firmware update, running a critical application, or other task that should not be interrupted. Still further, an action may be predetermined to be allowed from a current location depending upon the distance between the current location and the location of the computing system. For example, a datacenter policy may prohibit a user from taking a given action unless the current location of the user is less than a threshold distance away from the computing system. Accordingly, the method may include filtering out those actions that are not allowed based on the user's location or some other factor. The actions that are filtered out may be left out of the display or may be displayed while being shown as being unselectable.

Further embodiments of the method may include identifying the user of the mobile computing device, wherein the identified user is predetermined to have authority to select the displayed actions. Typically, a mobile computing device will be personal to a single individual user, such that the identity of the user is uniquely associated with a particular mobile computing device. Alternatively, the user of the mobile computing device may be determined by the specific logon credentials used to gain access to the mobile computing device. Non-limiting examples of logon credentials may include a username and password, facial recognition, and fingerprint recognition. Furthermore, a user may be authenticated using other biometrics or interrogation techniques. The identified user may be predetermined to have authority to select the displayed actions though a stored association of the user with an authority level, wherein the stored association may be manually input during setup of the system.

In various embodiments of the method, the mobile computing device may further display, for each of the plurality of displayed actions, a percentage of instances in which the action has been selected for responding to the identified condition. Accordingly, the user may benefit from an understanding of how frequently each of the displayed actions is selected by users responding to the identified condition. Optionally, the plurality of actions may be displayed in descending order of the percentage associated with each action. For example, the most frequently used action may be displayed on a screen at the top of a column of actions or perhaps to the left of a row of actions. Furthermore, a success rate of each action in addressing the identified condition may be displayed in addition to, or instead of, the selection percentage.

Still further embodiments of the method may include receiving, via an interface of the mobile computing device, user-input selecting an action from among the plurality of displayed actions, and sending an instruction from the mobile computing device to the computing system, wherein the instruction causes the computing system to execute the selected action. Preferably, the interface will include selectable virtual buttons that will respond to a touch input of a mouse click over the virtual button by sending an instruction corresponding with the text or other appearance of the virtual button.

In other embodiments, the method may further comprise automatically invoking a given action from among the plurality of actions. Examples of circumstances where a given action may be automatically invoked include: (1) where the given action has greater than a threshold level of a historical correlation between the identified condition and the given action, (2) where the given action has greater than a threshold level of a historical correlation between the identified condition and the given action for a mobile computing device at the identified current location, and (3) where the given action has a historical success rate at addressing the identified condition that exceeds a success rate threshold. Presumably, the thresholds for taking automatic action would be high enough that the action is beyond question the best action to take in response to the identified condition.

Still further, embodiments of the method may further include differentiating the appearance of one or more of the displayed actions that the user of the mobile computing device has previously selected in response to a condition of the same type as the identified condition. Optionally, actions that the user has previously selected in response to similar conditions may be highlighted or emphasized in some manner. In one specific implementation, the method may differentiate the appearance of one or more of the displayed actions that the user of the mobile computing device has previously selected at a frequency greater than a frequency threshold in response to a condition of the same type as the identified condition.

Another embodiment provides a computer program product comprising computer readable storage media that is not a transitory signal having program instructions embodied therewith, the program instructions executable by a processor to perform a method. The method comprises accessing, by a processor, a stored historical record of user-selected actions responsive to multiple types of conditions in a computing system, wherein each instance of a condition in the historical record is associated with a user-selected action that was taken by a user within a predetermined group of users. The method further comprises identifying a current instance of a condition within the computing system; identifying, by the processor, one or more actions within the historical record that were previously used in responding to the identified current instance of a condition; and outputting the one or more identified actions for display on a display screen. The foregoing computer program product may further include program instructions for implementing or initiating any one or more aspects of the methods described herein. Accordingly, a separate description of the methods will not be duplicated in the context of a computer program product.

Yet another embodiment provides an apparatus comprising at least one storage device for storing program instructions, and at least one processor for processing the program instructions to: access a stored historical record of user-selected actions responsive to multiple types of conditions in a computing system, wherein each instance of a condition in the historical record is associated with a user-selected action that was taken by a user within a predetermined group of users; identify a current instance of a condition within the computing system; identify one or more actions within the historical record that were previously used in responding to the identified current instance of a condition; and output the one or more identified actions for display on a display screen. The foregoing apparatus may further process the program instructions to implement or initiate any one or more aspects of the methods described herein.

FIG. 1 is a diagram of a system including a plurality of mobile computing devices 10 that communicate over a network 12 with a management server 20 of a computing system 90. While the management server 20 is connected to the computing system 90, various embodiments may allow users of the mobile computing devices 10 to select actions that are responsive to conditions within the computing system 90. More specifically, the method identifies a condition within the computing system 90. A plurality of actions are displayed on a screen of the mobile computing device 10, wherein the displayed actions are predetermined to be responsive to the condition. User-input is received via an interface of the mobile computing device 10, wherein the user-input selects an action from among the plurality of displayed actions, and an instruction is sent from the mobile computing device 10 to the computing system 90, wherein the instruction causes the computing system to execute the selected action.

Figure 2:
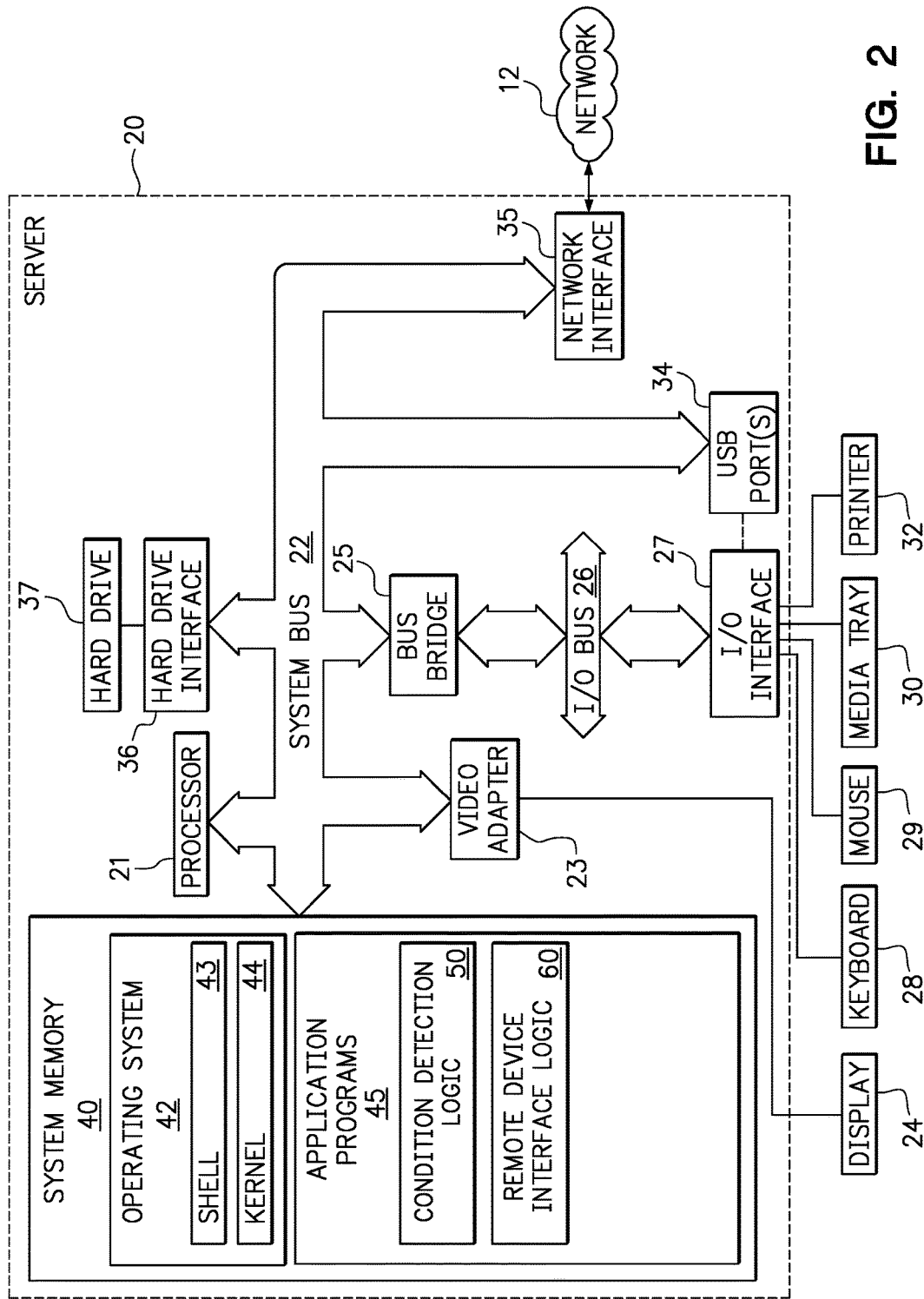
FIG. 2 is a diagram of the management server.

FIG. 2 is a diagram of a management server 20 that is included in the computing system. The server 20 includes a processor unit 21 that is coupled to a system bus 22. The processor unit 21 may utilize one or more processors, each of which has one or more processor cores. A video adapter 23, which drives/supports a display 24, is also coupled to the system bus 22. The system bus 22 is coupled via a bus bridge 25 to an input/output (I/O) bus 26. An I/O interface 27 is coupled to the I/O bus 26 and provides communication with various I/O devices, including a keyboard 28, a mouse 29, a media tray 30 (which may include storage devices such as CD-ROM drives, multi-media interfaces, etc.), a printer 32, and USB port(s) 34. As shown, the server 20 is able to communicate with other network devices, such as the multiple nodes within the computing system 90 (see FIG. 1) and the mobile computing devices 10 (see FIG. 1) via the network 12 using a network adapter or network interface controller 35.

A hard drive interface 36 is also coupled to the system bus 22 and interfaces with a hard drive 37. In a preferred embodiment, the hard drive 37 communicates with system memory 40, which is also coupled to the system bus 22. System memory includes the lowest level of volatile memory in the computer 20. This volatile memory may include additional higher levels of volatile memory (not shown), including, but not limited to, cache memory, registers and buffers. Data that populates the system memory 40 includes the operating system (OS) 42 and application programs 45.

The operating system 42 includes a shell 43 for providing transparent user access to resources such as application programs 45. Generally, the shell 43 is a program that provides an interpreter and an interface between the user and the operating system. More specifically, the shell 43 executes commands that are entered into a command line user interface or from a file. Thus, the shell 43, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 44) for processing. Note that while the shell 43 is a text-based, line-oriented user interface, embodiments will equally well support other user interface modes, such as graphical, voice, gestural, etc.

As depicted, the operating system 42 also includes the kernel 44, which includes lower levels of functionality for the operating system 42, including providing essential services required by other parts of the operating system 42 and application programs 45, including memory management, process and task management, disk management, and mouse and keyboard management. The application programs 45 in the system memory of the computer 20 may include, without limitation, condition detection module or logic 50 and a remote device interface module or logic 60.

The hardware elements depicted in the server 20 are not intended to be exhaustive, but rather are representative. For instance, the server 20 may include alternate memory storage devices such as magnetic cassettes, digital versatile disks (DVDs), Bernoulli cartridges, and the like. These and other variations are intended to be within the scope of the embodiments.

Figure 3:
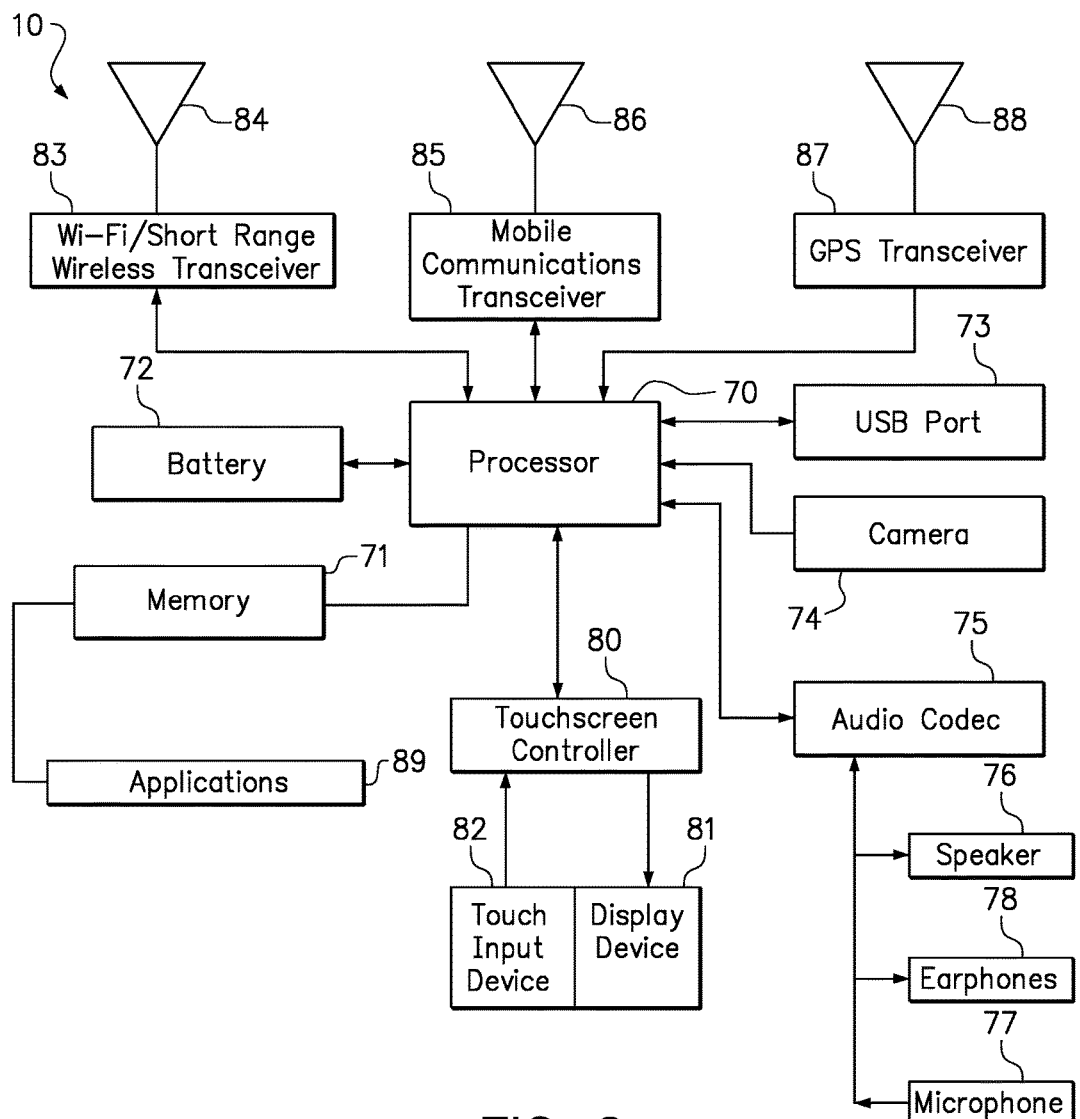
FIG. 3 is a diagram of a mobile computing device, such as a smartphone.

FIG. 3 is a diagram of a mobile computing device 10, such as a smart phone, that may be used to select an action responsive to a condition within the computing system according to various embodiments. The computing device 10 may include a processor 70, memory 71, a battery 72, a universal serial bus (USB) port 73, a camera 74, and an audio codec 75 coupled to a built-in speaker 76, a microphone 77, and an earphone jack 78. The communication device 10 may further include a touchscreen controller 80 which provides a graphical output to the display device 81 and an input from a touch input device 82. Collectively, the display device 81 and touch input device 82 may be referred to as a touchscreen.

The computing device 10 may also include a Wi-Fi™ and/or Bluetooth™ transceiver 83 and corresponding antenna 84, a mobile communication transceiver 85 and corresponding antenna 86, and/or a global positioning system (GPS) transceiver 87 and corresponding antenna 88. Accordingly, the Wi-Fi™ transceiver 83 enables communication between the mobile computing device 10 and a wireless network access point. In order to implement one or more embodiment, the memory 71 may store one or more applications 89, such as an "app" for causing the mobile computing device 10 to perform one or more steps of a method according to one or more embodiments.

Figure 4A:
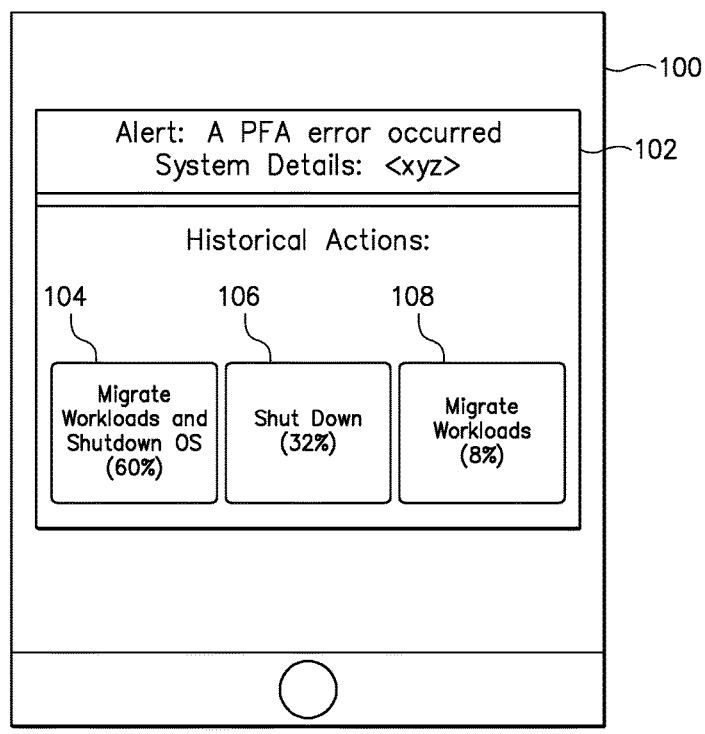
FIGS. 4A-C are illustrations of a graphical user interface according to various embodiments.
Figures 4B, 4C:
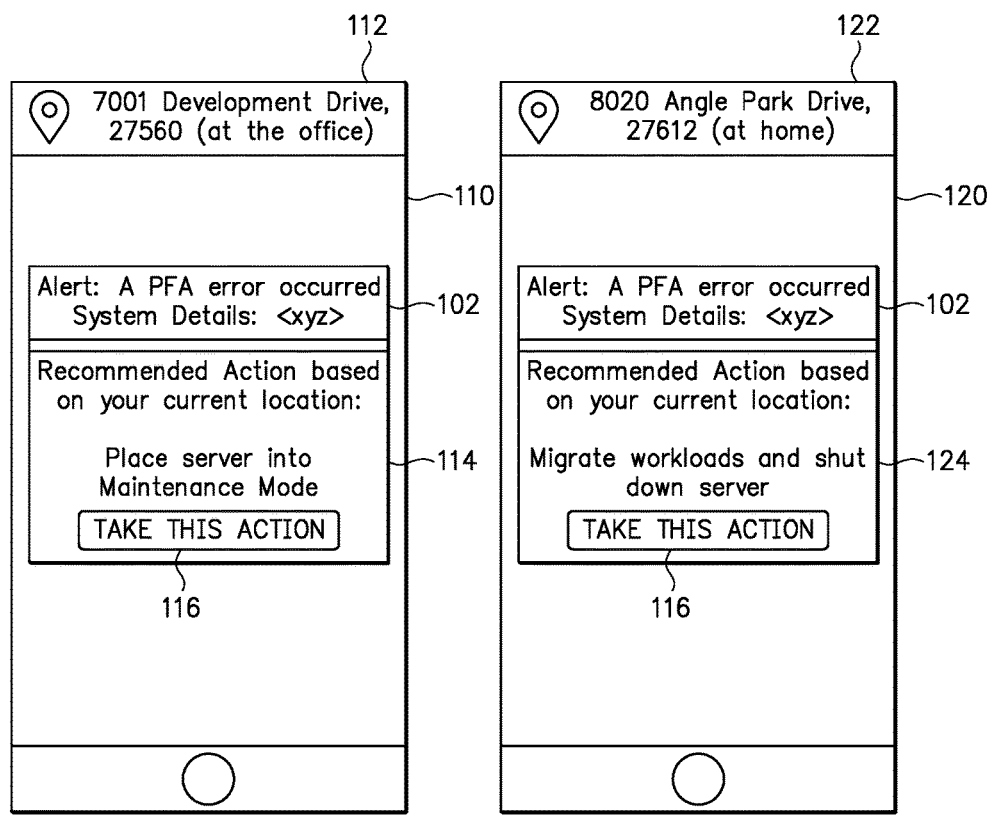

FIGS. 4A-C are illustrations of a graphical user interface according to various embodiments. The graphical user interface may be displayed on the display device 81 of the mobile computing device 10. FIG. 4A illustrates a first graphical user interface 100, according to a first embodiment, providing a text description 102 of a condition that has been detected within the computing system 90 (see FIG. 1). The first graphical user interface 100 of FIG. 4A further displays three (3) different selectable actions 104, 106, 108, including a text description "Migrate Workloads and Shutdown OS" (action 104), "Shut Down" (action 106), and "Migrate Workloads" (action 108). Furthermore, each of the selectable actions 104, 106, 108 is displayed with a stated percentage of instances in which the action has been taken in response to the type of condition identified in the text description 102. In this illustration, in response to an instance of the alert for "A PFA error has occurred" with "System Details: <xyz>", the historical actions include "Migrate Workloads and Shutdown OS" (action 104) which has been selected for 60% of the previous instances, "Shut Down" (action 106) which has been selected for 32% of the previous instances, and "Migrate Workloads" (action 108) which has been selected for 8% of the previous instances.

FIG. 4B illustrates a second graphical user interface 110 that includes a current location 112 of the mobile computing device 10 (see FIG. 10), a text description 102 of the condition that has been detected within the computing system 90 (see FIG. 1), and a text description 114 for a "Recommended Action based on your current location". In the illustration of FIG. 4B, the recommended action based on the location "at the office" is to "Place server into Maintenance Mode". A selectable action button 116 "TAKE THIS ACTION" is also provided.

FIG. 4C illustrates a third graphical user interface 120 that is similar to the second graphic user interface 110 of FIG. 4B, except that the current location 122 is "at home", such that the text description 124 for the recommended action is to "Migrate workloads and shut down server."

Figure 5:
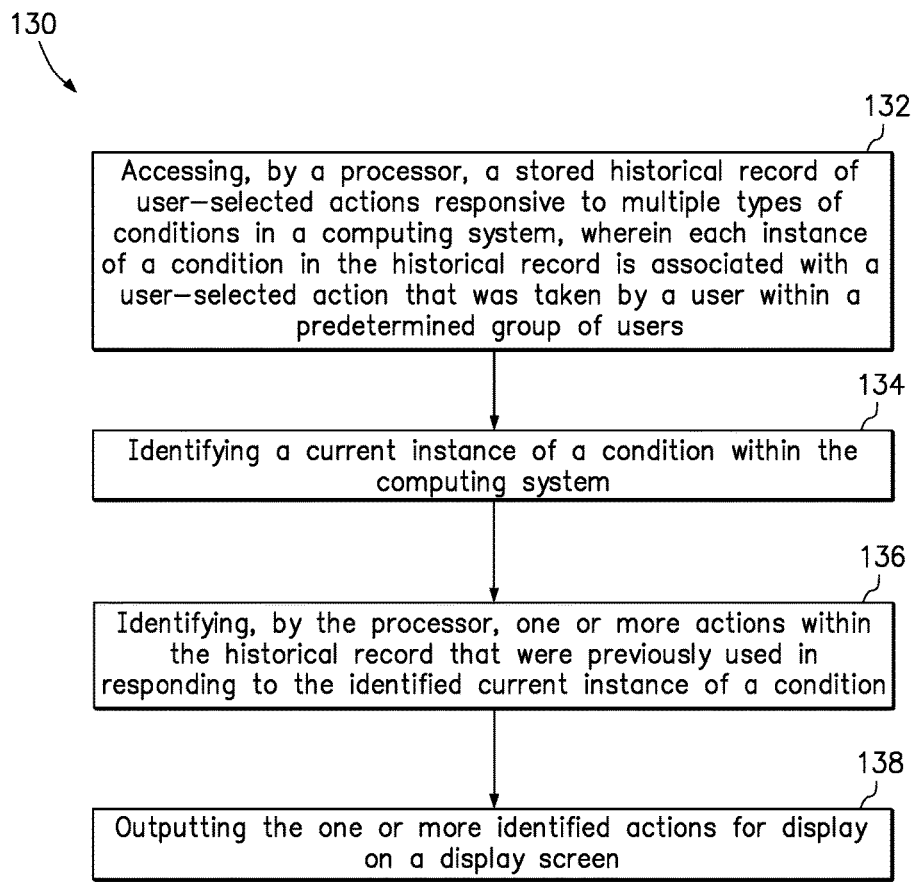
FIG. 5 is a flowchart of a method according to one embodiment.

FIG. 5 is a flowchart of a method 130 according to one embodiment. Step 132 accessing, by a processor, a stored historical record of user-selected actions responsive to multiple types of conditions in a computing system, wherein each instance of a condition in the historical record is associated with a user-selected action that was taken by a user within a predetermined group of users. Step 134 includes identifying a current instance of a condition within the computing system. Step 136 includes identifying, by the processor, one or more actions within the historical record that were previously used in responding to the identified current instance of a condition. Step 138 includes outputting the one or more identified actions for display on a display screen.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
    accessing, by a processor, a stored historical record of user-selected actions responsive to multiple types of conditions in a computing system, wherein each instance of a condition in the historical record is associated with a user-selected action that was taken by a user within a predetermined group of users;
    identifying a current instance of a condition within the computing system;
    identifying, by the processor, one or more actions within the historical record that were previously used in responding to the identified current instance of a condition;
    calculating, for each of the one or more actions, a score by weighting each instance that the action has been selected for responding to the identified condition, wherein the weighting is a user parameter associated with the user that selected the instance of the action, and wherein the user parameter is selected from the group consisting of an authority level, a duration that the user has had a logon to a system management device, a number of times the user has taken action responsive to the identified condition, and a combination thereof;

outputting the one or more identified actions for display on a display screen;

receiving, via a user interface, user-input selecting an action from among the one or more displayed actions; and sending an instruction to the computing system, wherein the instruction causes the computing system to execute the selected action.

2. The method of claim 1, wherein the predetermined group of users includes those users that are associated with a predetermined criteria selected from the group consisting of logon credentials to a designated system management device, inclusion in a predetermined list, user privileges exceeding a predetermined privilege level, and a combination thereof.

3. The method of claim 1, further comprising:
outputting the score for each of the plurality of one or more identified actions for display on the display screen.

4. The method of claim 1, further comprising:
storing user-selected actions responsive to multiple types of conditions in the computing system over a period of time to form the stored historical record.

5. The method of claim 1, further comprising:
identifying a current location of a mobile computing device including the display screen, wherein the displayed actions are predetermined to be allowed from the identified current location.

6. The method of claim 5, wherein the mobile computing device identifies the current location using signals from a global positioning system.

7. The method of claim 1, further comprising:
identifying a current location of a mobile computing device including the display screen, wherein the displayed actions are predetermined to be allowed from the identified current location in response to the identified current location being less than a distance threshold from the computing system.

8. The method of claim 1, further comprising:
identifying a user of a mobile computing device including the display screen, wherein the identified user is predetermined to have authority to select the displayed actions.

9. The method of claim 1, further comprising:
a management server within the computing system detecting the condition and automatically sending a notification to a mobile computing device including the display screen, wherein the notification identifies the condition.

10. The method of claim 1, further comprising:
outputting for display on the display screen, for each of the plurality of displayed actions, a percentage of instances in which the action has been selected for responding to the identified condition.

11. The method of claim 10, wherein the plurality of actions are displayed in descending order of the percentage associated with each action.

12. The method of claim 1, further comprising:
using, by the processor, the stored historical record to determine a historical correlation between the identified condition and a given action; and
automatically invoking the given action from among the plurality of actions in response to the given action having a historical correlation between the identified condition and the given action that exceeds a threshold level of correlation.

13. A method comprising:
accessing, by a processor, a stored historical record of user-selected actions responsive to multiple types of conditions in a computing system, wherein each instance of a condition in the historical record is associated with a user-selected action that was taken by a user within a predetermined group of users;
identifying a current instance of a condition within the computing system;
identifying, by the processor, one or more actions within the historical record that were previously used in responding to the identified current instance of a condition;
using, by the processor, the stored historical record to determine a historical correlation between the identified condition and a given action for a mobile computing device at an identified current location; and
automatically invoking the given action from among the plurality of actions in response to the given action having a historical correlation between the identified condition and the given action that exceeds a threshold level of correlation.

14. The method of claim 1, further comprising:
using, by the processor, the stored historical record to determine a success rate of a given action in addressing the identified condition; and
automatically invoking the given action from among the plurality of actions in response to the given action having a success rate that exceeds a success rate threshold.

15. The method of claim 1, further comprising:
differentiating the appearance of one or more of the displayed actions that has been previously selected in response to a condition of the same type as the identified condition.

16. A method comprising:
accessing, by a processor, a stored historical record of user-selected actions responsive to multiple types of conditions in a computing system, wherein each instance of a condition in the historical record is associated with a user-selected action that was taken by a user within a predetermined group of users;
identifying a current instance of a condition within the computing system;
identifying, by the processor, one or more actions within the historical record that were previously used in responding to the identified current instance of a condition;
outputting the one or more identified actions for display on a display screen;
differentiating the appearance of one or more of the displayed actions that has previously been selected at a frequency greater than a frequency threshold in response to a condition of the same type as the identified condition;
receiving, via a user interface, user-input selecting an action from among the one or more displayed actions; and
sending an instruction to the computing system, wherein the instruction causes the computing system to execute the selected action.

17. A computer program product comprising computer readable storage media that is not a transitory signal having program instructions embodied therewith, the program instructions executable by a processor to perform a method comprising:

accessing a stored historical record of user-selected actions responsive to multiple types of conditions in a computing system, wherein each instance of a condition in the historical record is associated with a user-selected action that was taken by a user within a predetermined group of users; identifying a current instance of a condition within the computing system; identifying one or more actions within the historical record that were previously used in responding to the identified current instance of a condition;

calculating, for each of the one or more actions, a score by weighting each instance that the action has been selected for responding to the identified condition, wherein the weighting is a user parameter associated with the user that selected the instance of the action, and wherein the user parameter is selected from the group consisting of an authority level, a duration that the user has had a logon to a system management device, a number of times the user has taken action responsive to the identified condition, and a combination thereof;

outputting the one or more identified actions for display on a display screen;

receiving, via a user interface, user-input selecting an action from among the one or more displayed actions; and sending an instruction to the computing system, wherein the instruction causes the computing system to execute the selected action.

18. An apparatus, comprising:

at least one storage device for storing program instructions; and at least one processor for processing the program instructions to:

access a stored historical record of user-selected actions responsive to multiple types of conditions in a computing system, wherein each instance of a condition in the historical record is associated with a user-selected action that was taken by a user within a predetermined group of users; identify a current instance of a condition within the computing system; identify one or more actions within the historical record that were previously used in responding to the identified current instance of a condition;

calculate, for each of the one or more actions, a score by weighting each instance that the action has been selected for responding to the identified condition, wherein the weighting is a user parameter associated with the user that selected the instance of the action, and wherein the user parameter is selected from the group consisting of an authority level a duration that the user has had a logon to a system management device, a number of times the user has taken action responsive to the identified condition, and a combination thereof;

output the one or more identified actions for display on a display screen;

receiving, via a user interface, user-input selecting an action from among the one or more displayed actions; and sending an instruction to the computing system, wherein the instruction causes the computing system to execute the selected action.

* * * * *